(12) United States Patent
Monroe et al.

(10) Patent No.: US 7,347,265 B2
(45) Date of Patent: Mar. 25, 2008

(54) METHOD OF FORMING TEMPORARY BLOCKING GEL CONTAINING GUAR DERIVATIVE

(75) Inventors: Terry Monroe, Lafayette, LA (US); Brian Evans, The Woodlands, TX (US); Hoang Le, Spring, TX (US); Brian Beall, Spring, TX (US)

(73) Assignee: BJ Services Company, Houston, TX (US)

( * ) Notice: Subject to any disclaimer, the term of this patent is extended or adjusted under 35 U.S.C. 154(b) by 210 days.

(21) Appl. No.: 10/810,539

(22) Filed: Mar. 26, 2004

(65) Prior Publication Data

US 2005/0211435 A1 Sep. 29, 2005

(51) Int. Cl.
*E21B 33/13* (2006.01)
(52) U.S. Cl. .......................................... 166/294; 175/72
(58) Field of Classification Search .................... None
See application file for complete search history.

(56) References Cited

U.S. PATENT DOCUMENTS

| | | | |
|---|---|---|---|
| 5,201,370 A * | 4/1993 | Tjon-Joe-Pin | 166/300 |
| 5,224,544 A | 7/1993 | Tjon-Joe-Pin et al. | |
| 5,447,199 A | 9/1995 | Dawson | |
| 5,547,026 A | 8/1996 | Brannon et al. | |
| 5,566,759 A | 10/1996 | Tjon-Joe-Pin et al. | |
| 5,813,466 A * | 9/1998 | Harris et al. | 166/300 |
| 6,017,855 A | 1/2000 | Dawson et al. | |
| 6,138,760 A * | 10/2000 | Lopez et al. | 166/300 |
| 6,383,990 B1 | 5/2002 | Dawson et al. | |
| 6,387,853 B1 | 5/2002 | Dawson et al. | |
| 6,649,572 B2 | 11/2003 | Dawson et al. | |
| 6,793,018 B2 * | 9/2004 | Dawson et al. | 166/300 |
| 7,036,590 B2 * | 5/2006 | Harris | 166/280.1 |

FOREIGN PATENT DOCUMENTS

| | | |
|---|---|---|
| WO | WO 02/055843 A1 | 7/2002 |
| WO | WO 03/001030 A1 | 1/2003 |

* cited by examiner

*Primary Examiner*—Zakiya W. Bates
(74) *Attorney, Agent, or Firm*—Jones & Smith, LLP; John Wilson Jones

(57) ABSTRACT

A high temperature blocking gel contains a blend of an aqueous fluid and carboxymethyl guar and a crosslinking agent. The gel exhibits excellent hydration capability in brines and positive viscosity generation and controls fluid loss from an oil well during drilling, completion and/or workover operations.

11 Claims, No Drawings

METHOD OF FORMING TEMPORARY BLOCKING GEL CONTAINING GUAR DERIVATIVE

FIELD OF THE INVENTION

The invention relates to a method of forming a blocking gel containing carboxymethyl guar (CMG) and a crosslinking agent within a wellbore within a subterranean formation for use in fluid loss control.

BACKGROUND OF THE INVENTION

It is not uncommon to temporarily cease production from wellbore operations in order to perform auxiliary procedures, such as workover operations at different depths of a subterranean formation. Workover operations frequently use heavy brines and other fluids to maintain pressure control within the reservoir. Such fluids can leak-off into the production zone, causing damage which interferes with the efficient operation of the well.

Isolating the production zone protects it from damage. Specific blocking materials, such as solid blocking agents or temporary blocking gels isolate the production formation. Solid blocking agents, such as nylon or rubber balls, are injected into the fluid stream and seal the production formation by physically stopping up perforations in the formation. When the injection ends, the material is no longer held against the perforations and falls to the bottom of the well.

The use of temporary blocking gels successfully protects the production zone. Blocking gels formed by gelation of suitable polymers, such as appropriate polysaccharides produce a relatively impermeable barrier across the production formation. The barrier cordons off the production zone from the area undergoing the workover operations. These areas must remain separated until production is ready to resume.

Production resumes after removal of the blocking gel. The removal of the blocking gel is accomplished by reducing the viscosity of the fluid to a low value such that it flows naturally from the formation under the influence of formation fluids and pressure. This viscosity reduction or conversion is referred to as "breaking" and is often accomplished by incorporating chemical agents, referred to as breakers, into the initial gel.

Blocking gels have been used in low temperature zones for many years. However, certain problems have been associated with isolating high temperature subterranean zones, principally due to insufficient or unstable rheological properties of the crosslinked blocking gels.

Guar gum and guar gum derivatives, such as those containing hydroxypropyl guar (HPG) or carboxymethylhydroxypropyl guar (CMHPG), have been used to viscosify water and brine for the purpose of controlling fluid loss from oil wells during drilling, completions and workover operations. Such viscous polymer gels prevent fluid movement into subterranean formations by both high viscosity and filter cake deposits on the interface between the wellbore and the subterranean formation.

U.S. Pat. No. 5,547,026 discloses HPG and CMHPG blocking gels suitable for use in low to relatively high temperatures greater than about 250° F. to enable temporary isolation of the producing zone for an extended period of time. Blocking gels of greater thermal stability are desired.

SUMMARY OF THE INVENTION

A blocking gel is formed within a wellbore within a subterranean formation by first forming a base fluid of a blend of an aqueous fluid and carboxymethyl guar. The base fluid typically contains between from about 40 to about 120 pounds of carboxymethyl guar (CMG) per 1000 gallons (4.79 to 14.37 kg/m$^3$) of aqueous fluid.

A crosslinking agent is further added to the base fluid to form a crosslinkable gel. In a preferred mode, the crosslinking agent contains zirconium, such as zirconium lactate, zirconium glycolate and zirconium lactate triethanolamine.

The crosslinkable gel, typically having a pH between from about 4.0 to about 11.0, is then pumped into the subterranean formation.

A gel breaker may further be introduced to the crosslinkable gel. The gel breaker may be contacted with the blocking gel after the crosslinkable gel is pumped into the subterranean formation. Alternatively, the gel breaker may be provided as a portion of the crosslinkable gel prior to pumping of the gel into the formation.

After applying the blocking gel to the formation, the gel breaker is allowed to degrade the crosslinked polymer, whereby the fluid can be removed from the subterranean formation to the well surface. Because the fluid is mixed and pumped partially hydrated, it has a low viscosity which minimizes friction pressures and which allows placement using coiled tubing.

The formation of the blocking gel serves to control fluid loss from an oil well during drilling, completion and/or workover operations.

The blocking gel can further be used for blocking non-productive, thief zones for example to prevent lost circulation during drilling operations. In such cases, the blocking fluid would not generally require the addition of a gel breaker, but would remain as a semi-permanent blocking material.

DETAILED DESCRIPTION OF THE PREFERRED EMBODIMENTS

The temporary blocking gel of the invention is designed to provide fluid loss control in deep, hot wells and is typically applied after perforating to enable safe retrieval of gun assemblies, following well completion or workover procedures, or in other circumstances, such as those which require a removable, high viscosity polymer pill. The gel can be used, for instance, to seal open holes and perforations, holding the differential pressure required to hold a full column of fluid in the well. The temporary blocking gel of the invention, characterized as a high viscosity, crosslinked polymer gel, is capable of forming a thin filter cake.

The aqueous blocking gel is first prepared by blending hydratable CMG into the aqueous fluid. The aqueous fluid could be, for example, water, brine or water alcohol mixtures. Sodium bromide or potassium chloride brines are preferred.

CMG contains carboxylate groups which are anionically charged except in strong acid. These anionically charged groups tend to repel away from one another. Because they are chemically bound to the guar, repulsion of the anionic groups also causes the polymer to occupy a much larger volume than the unsubstituted guar polymer. Thus, the CMG gel of the invention exhibits greater viscosity and oil well fluid loss control properties than the base linear gels of the prior art.

The CMG can be obtained in many ways, including a) using premium grade guar as the starting material to which the anionic groups are chemically added; and/or b) selecting processing parameters that provide better uniformity in placing the anionic substituents on the guar polymer backbone; and/or c) additional processing steps, including ultra-washing to remove impurities and refine the CMG polymer. Preferred polymers include those guars having randomly distributed carboxymethyl groups, including those set forth in U.S. Pat. No. 6,017,855, herein incorporated by reference.

The pH range of the aqueous base fluid, prior to the addition of the crosslinking agent, is between from about 4.0 to about 11.0, preferably between from about 6.0 to about 9.5. The pH of the fluid is adjusted by the addition of a suitable buffer to the aqueous base fluid. Suitable buffers for pH adjustment include calcium oxide, magnesium oxide, ammonium hydroxide, or other well known oxides, hydroxides or basic materials.

The crosslinking agent employed in the invention is generally a heat delayed crosslinking agent in that no increase in viscosity is evidenced in the temporary blocking gel until the temperature in the wellbore is at least 125° F. (52° C.). The CMG is capable of gelling in the presence of a crosslinking agent at the above-described pH range to form the gelled base fluid. Suitable crosslinking agents are those which will increase the viscosity of the CMG polymer solution by forming a complex with the anionic substituent on the polymer. The liquid crosslinking agent is typically present in the aqueous base fluid in a range from about 0.05 to about 0.5 percent by volume, with a preferred concentration of about 0.1 to about 0.3 percent by volume.

The crosslinking agent can be any of the conventionally used crosslinking agents which are known to those skilled in the art. For instance, the crosslinking agent may contain a metal ion, such as aluminum, antimony, boron, chromium, zirconium or titanium, including organotitanates. Transition metals are preferred.

Preferred crosslinkers include chromium ions as well as those zirconium based compounds which will effectively form a complex, such as a chelate, with the CMG polymer, including any material which supplies zirconium ions in solution. Thus, the crosslinking agent can be any convenient source of zirconium ions. Preferred zirconium based crosslinkers include, zirconium lactate, including sodium zirconium lactate, zirconium glycolate and zirconium lactate triethanolamine. The most preferred zirconium based crosslinker is zirconium lactate.

The blocking gel fluid is pumped at a rate sufficient to coat the formation interval. On addition of heat, the fluid viscosifies. Crosslinking at the surface occurs inhibiting the release of CMG from the particle surface to the water. This results in the formation of small, solvated polymer domains. The swelling causes the CMG particles to become plastic-like and deformable. In addition, the particle surfaces are sticky, allowing some association of these polymer domains. The particle's stickiness and the concentration of particles yield a higher viscosity fluid than that of the fluid made from fully hydrated CMG polymer.

The blocking gel fluid may further contain a gel breaker. External or internal breakers or a combination thereof may be used. External breakers, applied after the crosslinkable gel is pumped into the formation, are more efficient at elevated temperatures and thus are more preferred. Since it is designed for high temperature use, breaker systems with temperature limits less than 275° F. (135° C.) are not as highly recommended. An acid may be used to lower the pH to break the crosslinked gel structure.

Breakers commonly used in the industry for this particular application include inorganic, as well as organic, acids, such as hydrochloric acid, acetic acid, formic acid, and polyglycolic acid; persulfates, like ammonium persulfate; calcium peroxide; triethanolamines; sodium perborate; other oxidizers; antioxidizers; and mixtures thereof.

The present invention may further use an enzyme breaker, added to the crosslinkable gel prior to pumping the gel into the formation or added to an external breaker solution after pumping of the crosslinkable gel into the formation. Thus, the enzyme breakers can be internally incorporated within the gel, externally applied to the gel or a mixture of both. When the enzyme breakers are added depends upon the conditions of the procedure. The preferred method of application is a mixture of both of the above techniques.

The enzyme breaker system is typically a mixture of highly specific enzymes which, for all practical purposes, completely degrade the CMG backbone of the crosslinked blocking gel. The preferred enzyme breakers of the invention are hydrolases that are stable in the desired pH range from about 4.0 to 11.0 and remain active at a pH above about 8.0. The same enzymes are active at low to high temperatures of about 50° F. to about 275° F. and above. The preferred enzyme breakers are specific to hydrolyze greater than about 90% of the CMG backbone. The enzymes attack the mannosidic and galactomannosidic linkages in the CMG backbone, breaking the backbone into monosaccharide and disaccharide fragments. Under some conditions, the enzymes break the CMG completely into monosaccharide fragments. The preferred enzymes are gammanase hydrolases collectively called galactomannase and they specifically hydrolyze the 1,6-α-D-galactomannosidic and the 1,4-β-D-mannosidic linkages between the monosaccharide units in the guar backbone respectively. One preferred galactomannase is commercially available from Novo Nordisk of Norway as "Gammanase 1.5 L." The preferred concentration of galactomannase is 1:2 (weight/weight) solution of 1,6-α-D-galactosidase and mannan indo-1,4-β-D-mannosidase, the galactomannase being present in the range from about 0.001 to 0.004% by weight, based on the total weight of aqueous fluid.

A bicarbonate compound may be added to the blocking gel to delay the formation of the crosslinked gel. Gelation kinetics may be dependent on the bicarbonate content of the aqueous fluid. Bicarbonate concentrations near 500 ppm often require fluid temperatures in excess of 140° F. (60° C.) to initiate full gelation. To overcome this temperature dependency, the fluid pH may be adjusted to about 5.0 or less to reduce the bicarbonate content. At a pH of about 5, gelation may occur within acceptable times at ambient temperature. For higher temperature applications, the presence of bicarbonate may be desirable in that it can be used to delay gelation temporarily, thereby increasing shear tolerance of the fluid during pumping. When using bicarbonate to delay gel formation, the fluid pH may be increased to exceed 9.0. Gelation of the fluid at low pH allows pumping the gel with $CO_2$ for either gas assist or foam treatments. It is within the skill in the art to optimize the gelation kinetics by adjusting the pH and additives in the fluid.

As has been described and is customary in the industry, additional amounts of such additives as pH control agents, crosslinking delay agents, antifoamers, surfactants, antioxidants and the like are added to the base fluid. In a preferred embodiments, antioxidants, such as GS-1 gel stabilizer of BJ Services Company is added to the crosslinkable fluid prior to pumping of the fluid into the subterranean formation. Additionally, an alcohol such as methanol, ethanol, isopropanol may be added to the aqueous base fluid to retard hydration of the polymer, as is well known in the art. However, such additives should be selected so as not to interfere with the interactions of the anionic groups on the CMG polymer.

The blocking gel is preferably mixed and pumped partially hydrated. This allows mixing and pumping at low viscosity which minimizes friction pressures. The lower friction pressures allow placement of the blocking gel system using coiled tubing, where desired.

The invention has several advantages over the blocking gels over the prior art. The prior art blocking gels have been limited in brine composition and density as well as the downhole temperature of the subterranean formation. The use of CMG enables the viscous gels to be mixed in high-density brines formulating a blocking gel exhibiting higher thermal stability. Unlike the processes of the prior art, such as those disclosed in U.S. Pat. No. 5,547,026, the use of the more highly efficient CMG renders the addition of unhydrated polymer particulate to the base fluid unnecessary. Further, the addition of unhydrated polymer particulate to the base fluid is rendered unnecessary in light of the initial gel loading of the CMG polymer and the efficiency of the resulting filter cake. Less CMG polymer is therefore required to create the seal downhole in the wellbore.

The blocking gels of the invention are therefore useful in low to high temperature deep formations, the CMG being added to the aqueous base fluid to provide a lower polymer loading in the range from about 40 to 120 pounds of dry CMG per 1000 gallons (4.79 to 14.37 kg/m$^3$) of aqueous fluid depending upon the required viscosity and other well bore conditions. Alternatively, where a slurried polymer dispersion is desired for use, the CMG may be added to the aqueous fluid in the range from about 0.5 to about 1.5% by weight based on the total weight of the base fluid. The brine densities typically vary between from about 8.30 to about 17.0 pounds per gallon (994.6 to 2037.1 kg/m$^3$).

Thus, lower loadings of the CMG can be used to obtain equivalent blocking gels at reduced overall treatment costs. Reduced polymer loadings may also result in less damage to the surrounding subterranean formation.

While the mixing procedure of the invention allows the blocking gel to reach deep formations, the procedure further yields stability, low fluid leakoff and low gel penetration into the formation matrix.

The CMG based blocking gel of the invention further enables the temporary isolation of producing zones for extended periods of time at temperatures greater than 250° F. (121.1° C.). Further, the blocking gels can be removed at any time without leaving damaging polymeric residue. The CMG blocking gels are effective and have desirable cleanup characteristics in high temperature subterranean zones.

The molecular structure of CMG is the principal reason for its successful application in the blocking gel. Removing the hydroxypropyl group from CMHPG results in a more active polymer for a given molecular weight. Not having the hydroxypropyl group on the polymer further gives the CMG a greater affinity for water than other guars and guar derivatives, thereby making it easier to mix and hydrate in brines.

The CMG blocking gels possess stable rheologic properties at high temperatures for long period of times. Temporary isolation of the production zone is achieved without leaving damaging polymeric residue. The lower viscosities achieved allow the use of coiled tubing placement of the blocking gel, if desired.

The blocking gels can also be used to block non-productive, thief zones to prevent, for example, lost circulation during drilling operations.

The following examples will illustrate the practice of the present invention. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

The following materials are used in the examples below:

CMG-1 is non-aqueous slurry of CMG-2, having an effective polymer concentration of 4 pounds per gallon (480 kg/m$^3$) in the slurry;

CMG-2 is dry carboxymethyl guar.

AA is a buffering agent consisting of a mixture of acetic acid and anhydride;

ZrL is a zirconium lactate triethanol crosslinker;

Delay agent is a crosslinking delay agent containing sorbitol surfactant.

Pills were prepared and linear gel pumping viscosity was measured on a Fann 35 rheometer, 511 sec$^{-1}$, 300 rpm, using a R1-B1 rotor-bob configuration, as summarized in Table I:

TABLE I

| Component/ Test Parameter | | | |
|---|---|---|---|
| Brine Density Range | 8.38 lbs/gal (1010 kg/m$^3$) KCl Brine or 8.38-10.5 lbs/gal (1010-1260 kg/m$^3$) NaBr Brine | 10.5-11.5 lbs/gal (1260-1380 kg/m$^3$) NaBr Brine | 11.5-12.5 lbs/gal (1380-1500 kg/m$^3$) NaBr Brine |
| CMG-1 or (CMG-2) Viscosity | 5.26 gal. (20 L) or 21.2 lb (9.6 kg) 140-160 | 4.60 gal (17.5 L) or 18.5 lb (8.4 kg) 130-150 | 3.95 gal (15 L) or 15.9 lb (7.2 kg) 120-140 |

The samples were prepared in accordance with the following procedure:

1. About 1.0 m$^3$ of brine was loaded into a mixing tank.
2. CMG-1 or CMG-2 was then added to the mixing tank. When used, CMG-1 was added directly to the blender containing neutral pH brine. The amount of CMG-2 or CMG-1 was a function of the brine density and downhole conditions since heavier brines typically generate greater viscosity than light brines with a given amount of polymer. The net polymer loadings varied between 60 and 80 pounds per thousand gallons (7.18 and 9.58 kg/m$^3$) depending on sodium bromide brine density and bottom-hole conditions.
3. After the polymer was completely dispersed in the brine, AA was added to lower the pH of the brine and to initiate hydration of the polymer. The natural pH of sodium bromide brine is approximately 8.0. The amount of AA added to the brine was about 1.0 l or an amount sufficient to attain a pH of between about 5.0 to about 6.0. Typically, the polymer did not hydrate until the brine pH was lowered to a pH within the range of between about 5.5 to about 6.5. Typically, the required volume of AA was usually close to 0.5 to 0.75 gallons per thousand gallons (gpt) (0.06 to 0.09 kg/m³) and rarely exceeded 1.0 gpt (0.12 kg/m³). About half of the buffer volume was added initially and the remainder was added slowly while monitoring the gel pH.

4. The gel was then allowed to hydrate 15 to 60 minutes while the gel was stirred or circulated.
5. About 0.265 gal (1.0 L) of KOH buffer was then added slowly or a sufficient amount was added to raise the pH of the gel to between 9 to about 10. Typically, the amount of KOH was added was about 1.5 times the amount of AA used.
6. The ZrL crosslinker and the delay agent at a concentration of 0.53 gal (2 L) each were premixed and then added to the mixing tank. The ZrL crosslinker delay time was several hours at ambient temperature and 12-16 minutes on a ramp from 70° F. to 300° F. (21° C. to 149° C.). The crosslinker became very active at fluid temperatures of 125° F. (52° C.) and greater. Addition of the ZrL crosslinker/delay agent package did not change the linear gel viscosity at ambient conditions.

A modified high temperature high pressure (HTHP) fluid loss cell was used to evaluate the filter cake deposition efficiency of the above fluid loss control fluids. This apparatus was chosen because of the ability to closely approximate downhole conditions of permeability, temperature and pressure. The test was performed as follows:

a. Berea, aloxite or ceramic discs of known permeability or micron ratings in a base fluid, i.e. water or light brine, were saturated.
b. After saturating, the disc was loaded into the fluid loss cell and assembled bottom end into the cell, secured with setting screws, and the stem closed.
c. The cell was then filled with the above-described fluid loss control fluids the top end cap was placed into the cell. The cap with setting screws was secured and the stem was closed.
d. The assembled cell was then closed into a heating jacket.
e. If the test temperature was greater than the boiling point of water, then a pressurized backpressure accumulator was required to collect and condense the filtrate from the test cell.
f. A nitrogen supply hose was affixed, the top stem opened and the cell pressurized to desired pressure with nitrogen, usually 200 to 300 psi differential pressure.
g. When the cell reached test temperature, the bottom stem was opened and the filtrate volume vs. elapsed time was recorded.
h. Upon completion of the test, the top and bottom stems were closed and the cell was removed from the heating jacket.
i. After cell was cooled to room temperature, the top stem was slowly opened to vent nitrogen pressure. The disk was removed for inspection.

The fluid loss data for 60 pounds CMG-1 in 12.5 lbs/gal (1500 kg/m³) NaBr brine 2.5μ ceramic disc, 2.44 inch (6.2 cm) diameter, 300° F. (149° C.), 200 psi ΔP, is set forth in Table II below:

TABLE II

| Time (hr:min) | Volume (cc) | Rate (cc/hr/cm²) |
|---|---|---|
| 0:01 | 2.3 | 4.64 |
| 0:05 | 4.6 | 1.13 |
| 0:11 | 6.7 | 0.68 |

TABLE II-continued

| Time (hr:min) | Volume (cc) | Rate (cc/hr/cm²) |
|---|---|---|
| 0:20 | 9.1 | 0.53 |
| 0:42 | 12.9 | 0.34 |
| 1:00 | 15.5 | 0.29 |
| 15:40 | 62.0 | 0.10 |
| 17:30 | 66.9 | 0.09 |
| 18:40 | 69.2 | 0.06 |
| 20:32 | 72.9 | 0.07 |
| 21:36 | 75.1 | 0.07 |
| 23:23 | 78.5 | 0.06 |

From the foregoing, it will be observed that numerous variations and modifications may be effected without departing from the true spirit and scope of the novel concepts of the invention.

What is claimed is:

1. A method of forming a blocking gel within a wellbore within a subterranean formation, the method comprising the steps of:
   forming an aqueous base fluid comprising between from about 40 to about 120 pounds per 1,000 gallons of carboxymethyl guar;
   adding to said aqueous base fluid a heat delayed crosslinking agent to form a gelled crosslinkable fluid, the pH of the gelled crosslinkable fluid being between from about 4.0 to about 11.0; and
   pumping the gelled crosslinkable fluid into a subterranean formation adjacent the wellbore
   wherein the gelled crosslinkable fluid forms a barrier within the formation when the temperature in the wellbore is greater than 125° F.

2. The method of claim 1, wherein a gel breaker is further introduced to the gelled crosslinkable fluid.

3. The method of claim 2, wherein the gel breaker is an enzyme.

4. The method of claim 3, wherein the gelled crosslinkable fluid is contacted with the enzyme breaker subsequent to placement of the gelled crosslinkable fluid into the subterranean formation.

5. The method of claim 1, wherein the crosslinking agent contains zirconium.

6. The method of claim 5, wherein the crosslinking agent is selected from the group consisting of zirconium lactate, zirconium glycolate and zirconium lactate triethanolamine.

7. A method of controlling fluid loss within a wellbore within a subterranean formation during drilling, completion and/or workover operations which comprises:
   forming a gelled, aqueous base crosslinkable fluid comprising carboxymethyl guar and a crosslinking agent;
   pumping the crosslinkable fluid into a subterranean formation after a drilling, completion or workover procedure; and
   forming a blocking gel within the subterranean formation.

8. The method of claim 7, wherein the pH of the base crosslinkable fluid is between from about 4.0 to about 11.0.

9. The method of claim 7, wherein the base crosslinkable fluid contains between from about 40 to about 120 pounds per 1,000 gallons of carboxymethyl guar.

10. The method of claim 7, wherein the crosslinking agent contains zirconium.

11. The method of claim 7, wherein the crosslinking agent is selected from the group consisting of zirconium lactate, zirconium glycolate and zirconium lactate triethanolamine.

* * * * *